United States Patent [19]

Goldman et al.

[11] Patent Number: 4,995,074

[45] Date of Patent: Feb. 19, 1991

[54] SWITCHED LINE MODEM INTERFACE SYSTEM

[76] Inventors: Bruce J. Goldman; Gerald M. Goldman, both of Knollwood Extension, Elmsford, N.Y. 10523

[21] Appl. No.: 332,710

[22] Filed: Apr. 3, 1989

[51] Int. Cl.⁵ .................. H04M 3/20; H04M 11/06
[52] U.S. Cl. ........................... 379/97; 379/93; 379/215
[58] Field of Search ............... 379/93, 94, 96, 97, 379/98, 215

[56] References Cited

U.S. PATENT DOCUMENTS

| | | | |
|---|---|---|---|
| 4,751,726 | 6/1988 | Hepp et al. | 379/93 |
| 4,754,326 | 6/1988 | Kram et al. | 379/96 X |
| 4,852,151 | 7/1989 | Dittakavi et al. | 379/97 |

FOREIGN PATENT DOCUMENTS

| | | | |
|---|---|---|---|
| 3315884 | 11/1984 | Fed. Rep. of Germany | 379/96 |
| 59-36470 | 2/1984 | Japan | 379/94 |
| 63-250256 | 10/1988 | Japan | 379/215 |
| 2169172 | 7/1986 | United Kingdom | 379/94 |

OTHER PUBLICATIONS

"Microelectronics Data Book", Issue 5, 1/1988, pp. 3-157 to 3-161, (Exhibit A).
AT&T "Functional Product Class Criteria-PBX", AT&T Technical Reference, 9/1978 (Exhibit B).
S. Munich, "Monolithic Modem Chip Eases μP's Phone Access", EDN Magazine, 1984, pp. 2-187 to 2-198, (Exhibit C).
"CMOS Logic Databook", table of contents, 1988 edition.

Primary Examiner—Jin F. Ng
Assistant Examiner—Wing F. Chan
Attorney, Agent, or Firm—Natter & Natter

[57] ABSTRACT

A system is provided in a circuit switched network data transmission link between a user terminal and a host computer in instances where the terminal is connected to the network by a single telephone line and the terminal user has subscribed to a telephone company service feature such as call waiting. The system includes an interface at the terminal location between the telephone line and the terminal equipment. During a data session the interface detects a call waiting signal and generates a user signal. If the user desires to take the incoming call and suspend a data session, the interface responds to the telephone receiver being lifted off-hook and communicates through the circuit switched network with an interface at the host end of the communication. The host interface is programmed to maintain the data session at the host computer during a suspension of the communication by generating a signal simulating a terminal location signal. The terminal interface locally generates a signal indicating that the host is not ready and toggles the telephone company central office to switch the user's line to the incoming call. To resume the data session, the user places the telephone instrument on hook and the terminal interface toggles the central office to access the host interface for the purpose of resuming the data session.

19 Claims, 4 Drawing Sheets

SWITCHED LINE MODEM INTERFACE SYSTEM

BACKGROUND OF THE INVENTION

1. Field of the Invention

This invention relates generally to data transmissions utilizing a circuit switched network and more particularly to an interface system for preventing loss of a data session when a line is temporarily switched for an optional use.

2. Background Art

Among the many circuit switched network service features offered by telephone companies and some private exchanges which have been made available to a single line telephone subscriber have been the ability to switch between an existing call and a second incoming call which is "waiting" or placing an existing call on hold while making an outgoing call. A single line telephone subscriber was provided with a single telephone access number which supported a single voice grade circuit. The single line telephone instrument and/or equipment was connected to the telephone company central office and telephone company equipment over a local loop and supported analog transmissions on the local loop. In the "call waiting" situation, during the subscriber's initial conversation the telephone central office transmitted an audible "call waiting" signal to the subscriber. Upon receipt of such signal, the subscriber had the option of placing the existing call on hold and answering the incoming call. This was accomplished by toggling, i.e. pressing and releasing the hook switch in a predetermined sequence. The toggling thus constituted a communication with the central office instructing the telephone company equipment to alter the communications path. The central office then placed the existing call on hold and switched the incoming call to the subscriber's telephone line. Upon completion of the second call, the central office was again toggled to reinstate the initial call.

To utilize the call hold, conference call or three way calling optional service feature, the subscriber placed an existing call on hold, by toggling the central office, obtained a dial tone to initiate a second call and if the two calls were to be conferenced, again toggled the central office to effect conferencing. If the calls were not to be conferenced the second call was terminated and the original call reinstated by toggling.

Such telephone subscriber features, while convenient, presented problems when the initial call comprised a data session between a subscriber's personal computer terminal and a host computer. Often the incoming "call waiting" signal introduced data transmission errors at either the modem or the terminal. Not only did the "call waiting" signal interfere with the data transmission but, in addition, it was virtually impossible for the subscriber to access the incoming call waiting or even determine who the caller was without loss of the data session.

If the subscriber toggled the central office, not only did the toggle signal itself provide an error source, but, in addition, since neither the host nor the terminal was programmed to recognize that the central office placed their connection on hold status on their existing lines, carrier signals were lost and the communication was terminated. Such loss of communication resulted in unnecessary expense to the subscriber and generally required the subsequent reestablishment of another data session where at least a portion of the prior data transmission had to be duplicated. The same problems existed if a subscriber wished to initiate a call hold feature while on a data session.

When either feature was attempted to be utilized, the carrier signal between the terminal modem and the host modem was broken. Since the communications path through the telephone network was suspended, the carrier signal was lost causing the modems to disconnect the session.

SUMMARY OF THE INVENTION

In compendium, the invention comprises an interface system for use in data transmissions which utilize a circuit switched telephone network. An interface at the user terminal end of the transmission communicates with an interface at the host computer end of the transmission prior to and after suspension of a data session. During a data session, the interface detects a call waiting signal and rings the user's telephone instrument. If the user's telephone instrument goes offhook, the interface transmits appropriate status signals to the terminal for maintenance of the session while the user's telephone line is utilized for the incoming telephone call. The terminal end interface unit also communicates in-band with an interface at the host end which is programmed to maintain the data session at the host computer during the suspension period and keeps an offhook condition at the host central office. Thereafter, the terminal interface toggles the telephone company central office equipment to switch the user's telephone line to the incoming call.

When the subscriber wishes to resume the data session, he merely places his telephone instrument on hook. The terminal end interface then toggles the central office to reconnect the host communications path and communicates with the host interface to resume the data session.

From the foregoing compendium, it will be appreciated that it is a consideration of the present invention to provide a data transmission interface system of the general character described which overcomes the disadvantages encountered with the background art aforementioned.

An aspect of the present invention is to provide a data transmission interface system of the general character described which is easy to use.

To provide a data transmission interface system of the general character described which is relatively low in cost is a further consideration of the present invention.

A feature of the present invention is to provide a data transmission interface system of the general character described which permits a single telephone line subscriber utilizing the telephone network for a data transmission to employ a call waiting or call hold option during a data session without terminating the data session.

A further feature of the present invention is to provide a data transmission interface system of the general character described which facilitates utilization of optional telephone company service features.

Another aspect of the present invention is to provide a data transmission interface system of the general character described which does not require additional programming of a terminal or host computer and is transparent to such devices.

A still further consideration of the present invention is to provide a data transmission interface system of the general character described which is user accessed by conventional telephone instrument operation.

To provide a data transmission interface system of the general character described which is well suited for economical mass fabrication is another aspect of the present invention.

Other aspects, features and considerations of the present invention in part will be obvious and in part will be pointed out hereinafter.

With these ends in view, the invention finds embodiment in the certain combinations of elements, arrangements of parts and series of steps by which the aspects, features and considerations aforementioned and certain other aspects, features and considerations are attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENTS

Figure 1:
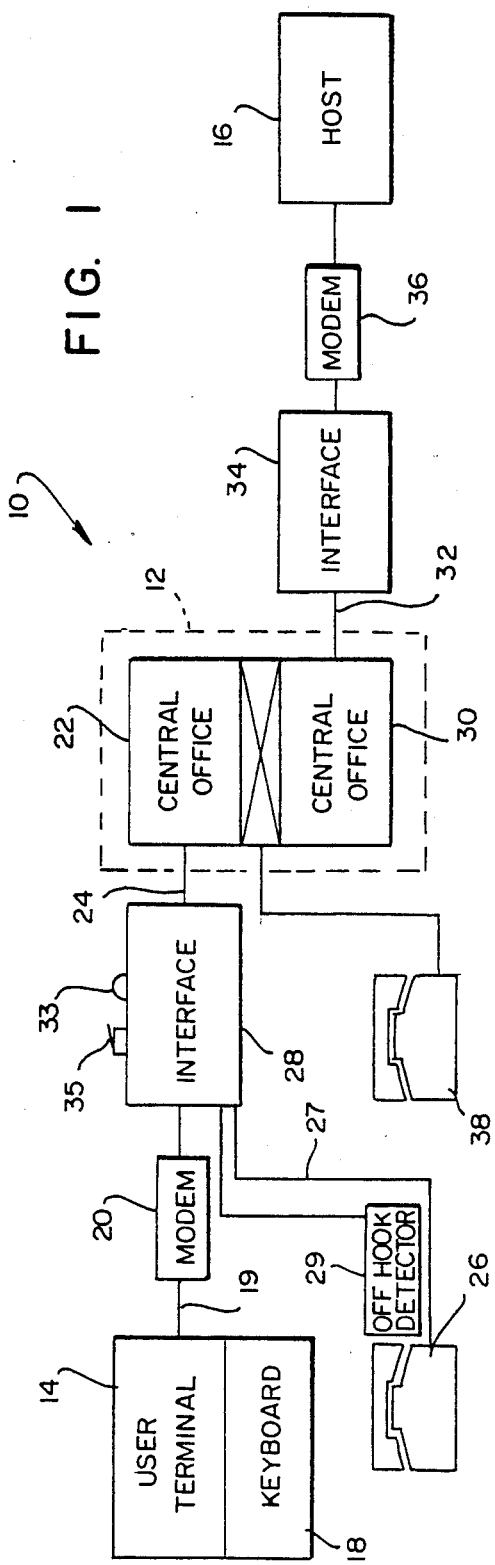
FIG. 1 is a schematized block diagram of a data transmission between a terminal and a host computer utilizing a public switched telephone network and showing a communications interface system constructed in accordance with the invention interconnecting the user terminal with the telephone network and a further interface interconnecting the host computer with the telephone network.

This invention relates to a single line supporting analog transmission on the subscribers "local loop" with telephone features allowing "toggling" the local telephone company equipment at the data terminal end to alter the endpoint of the single communications path without discontinuing the data session involuntarily. The interfaces that support the data session are at the terminal and host end, independent of the circuit switched network and are controlled by in-band signaling on the circuit between the interfaces.

Referring now in detail to the drawings, the reference numeral 10 denotes generally a data communications link utilizing a circuit switched network 12 for interconnecting a user terminal 14 with a host computer 16. The user terminal 14 is conventional in both construction and programming and typically includes a keyboard 18, a display and associated peripherals such as a printer. The terminal 14 is connected to a modem 20 through a connecting line 19. If the modem 20 comprises an internal modem, a separate connecting line is not required.

The modem 20 is in turn connected to a user's telephone company central office 22 by a telephone line 24 (local loop).

It should be understood that the user has a single telephone line and has subscribed with his telephone company for optional service features such as call waiting and/or call hold features, e.g. conference or three way calling that it actuated by toggling the network.

In accordance with the invention, an interface 28 is connected between the modem 20 and the telephone line 24. It is of significance that the user is employing a single telephone line 24 to the central office 22.

The user also has a conventional telephone instrument 26 which, however, is not connected directly to the telephone line 24 in a conventional manner but is connected to the interface 28 by a line 27. The communications link 10 extends through the public switched telephone network 12 to a host computer central office 30 and from the central office 30 to the host location via a telephone line 32.

At the host end of the communications link, the telephone line 32 is connected to an interface 34 and from the interface 34 to a host computer modem 36 which communicates with the host computer 16. The connection at the host end may also comprise a connection to a port on a network interface or entry into a protocol converter for purposes of compatibility and/or multiplexing multiple signals through a network.

An indicator 33 at the terminal end signals that the complimentary interface 34 is at the host end when the communications link is established through a protocol exchange of data upon a data call set up. Thus the terminal user will know that the interface system is operable.

In accordance with the invention, the interfaces 28, 34 of the system are totally transparent to both the user terminal 14 and the host 16. During a data session, data is transferred through the interfaces without interruption. In the event a third party wishes to place a telephone call, he utilizes a remotely located telephone instrument 38 which is connected to the public switch telephone network 12.

The third party call is received and held by the telephone network 12 while a call waiting signal is transmitted to the user through the telephone line 24.

Figure 3:
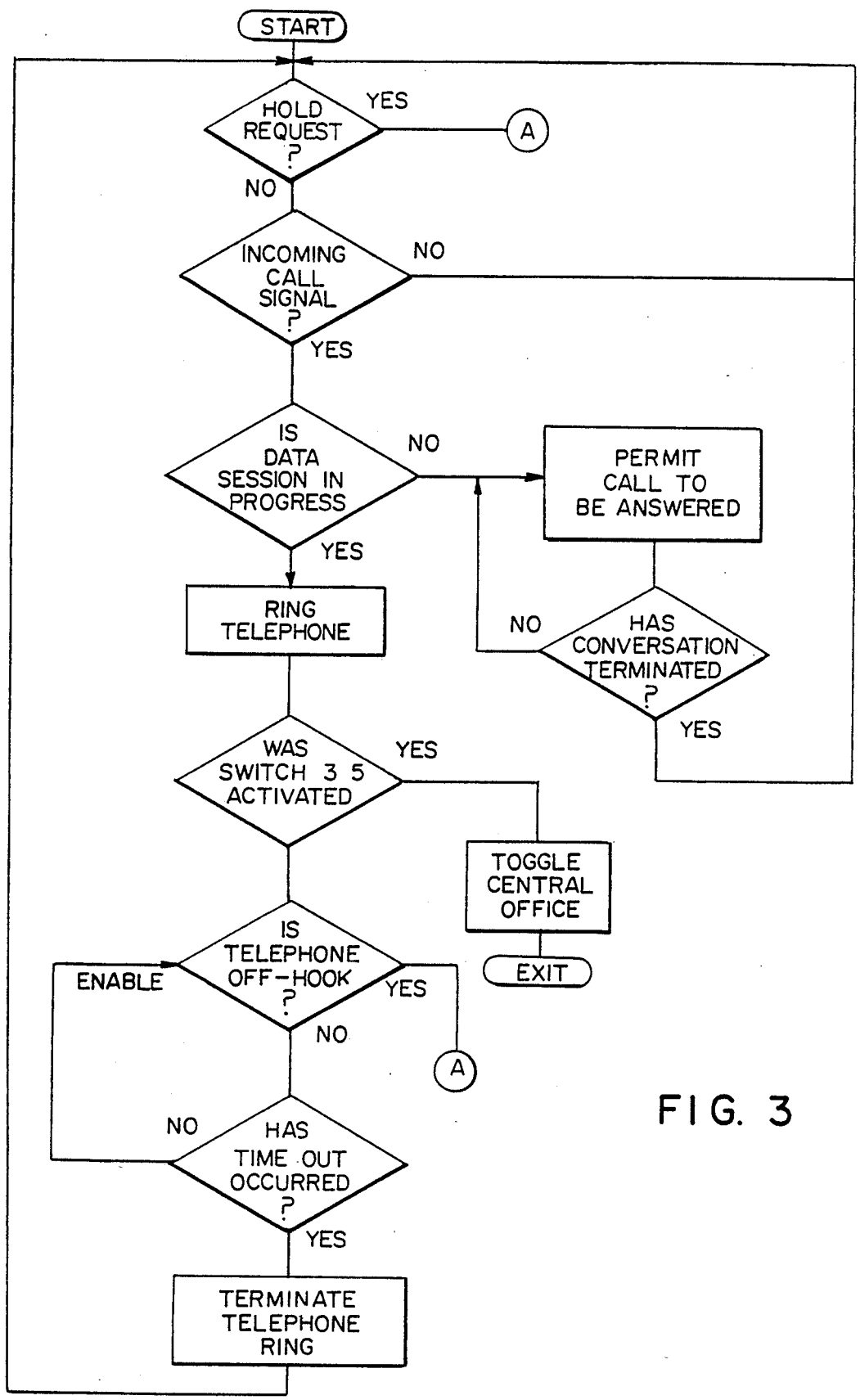
FIG. 3 is a diagram illustrating a user terminal interface processor subroutine for an incoming call waiting signal during a data session.
Figure 4:
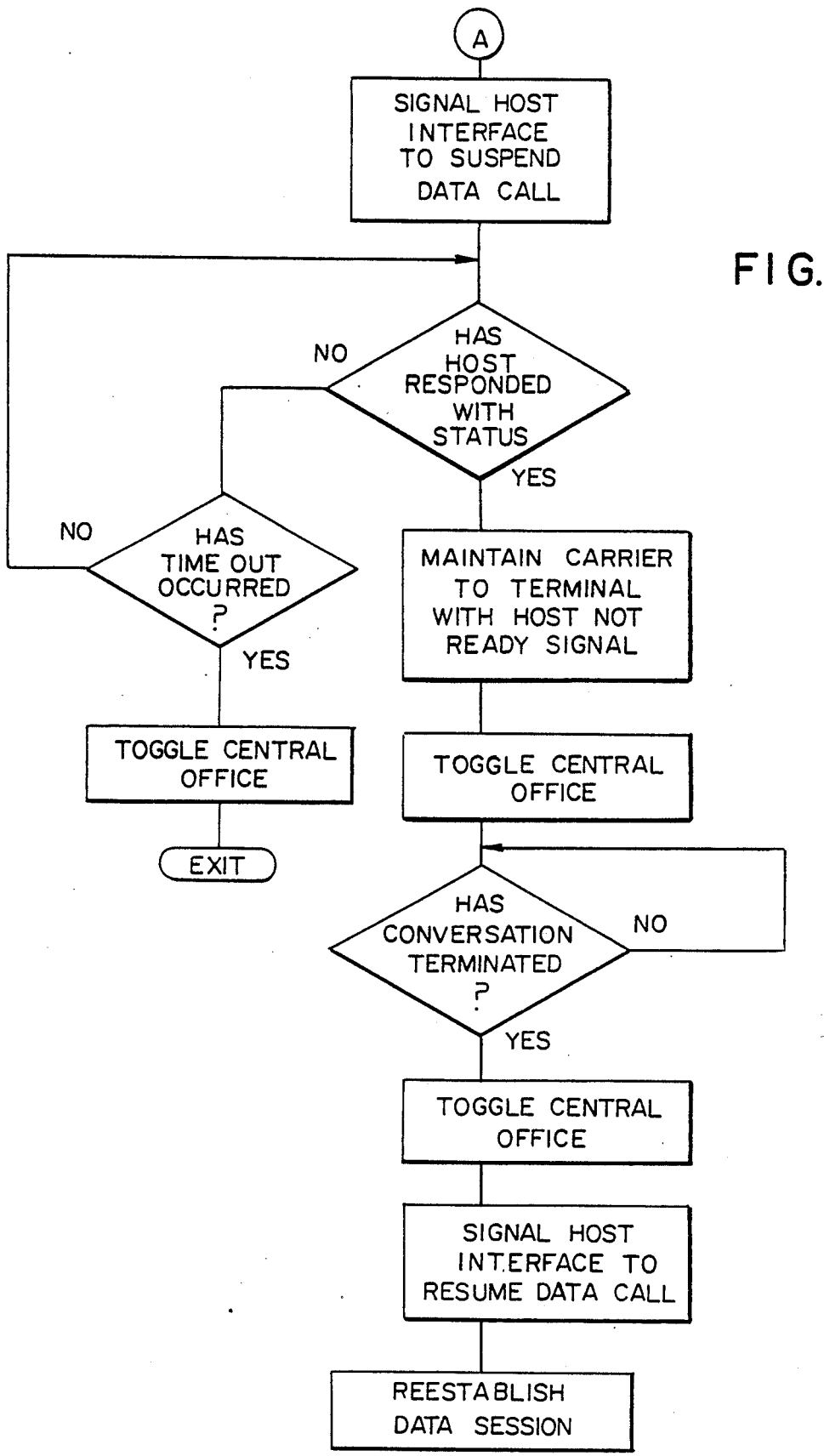
FIG. 4 is a continuation of the subroutine illustrated in FIG. 3.
Figure 5:
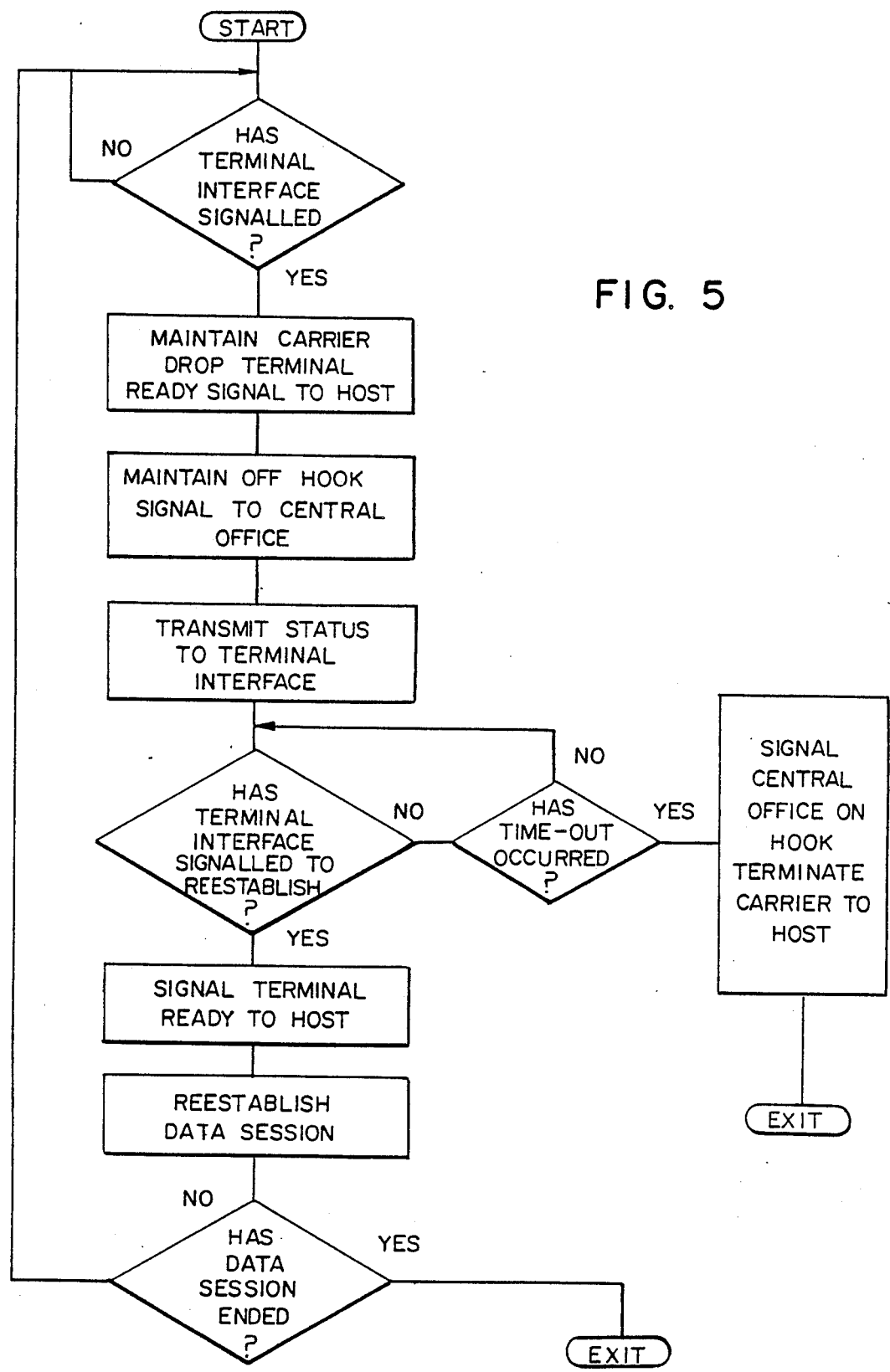
FIG. 5 is an illustration of a host computer interface processor subroutine whereby the telephone link to the terminal is discontinued without terminating the data session.

With reference now to the subroutines indicated in FIGS. 3 through 5, the interface 28 detects the call waiting signal and does not pass the signal on through to the modem 20. The interface 28 rings the user's telephone instrument 26 using local power. If the user decides to suspend the data session and take the incoming call, he merely lifts the telephone receiver so that the instrument is "offhook". In response to the "offhook" condition, detected by an offhook detector 29, the interface 28 transmits an in-band signal through the circuit switched network 12 to the host interface 34 which signal indicates that the call is about to be interrupted. Upon receipt of an in-band host interface responsive acknowledgement, the user interface 28 maintains the carrier signal to the modem 20 while at the same time the interface 28 can generate a signal indicating that the host is not ready. Thereafter, the interface 28 toggles the central office 22 and the central office switches the user's telephone line 24 to the telephone instrument 38 of the third party.

At the host end of the communication, the host interface receives the signal from the user interface 28 and, in response, maintains the carrier to the host modem 36 and drops the terminal ready signal going to the host. The host 16 is thus placed in a suspension state during the time that the user's telephone line 24 is switched to the third party call. In addition, the host interface 34 maintains an offhook signal to the central office 30 so that the telephone network line 32 is not disconnected. Also, the host interface communicates its status to the terminal interface. Upon receiving a subsequent in-band signal from the interface 28 through the network 12, the host interface 34 generates a terminal ready signal to the host and resumes its subroutine. Errors introduced due to suspension and reestablishment of the data session, network sign calling and the like are corrected by the higher level protocols contained in communications software when the data session is resumed.

Signaling between the interfaces 28, 34 is accomplished in-band yet preferably outside the frequency range of the data transmit and receive signals for the purpose of assuring that the interface communications are totally transparent to any data transmissions.

An optional switch 35 may be provided for the user to signal the interface 28 to break the carrier through the network 12 and terminate rather than suspend the data session. The switch 35 is actuated prior to lifting the receiver.

It should also be appreciated that during a data session, the interface 28 can respond to a user utilizing a call hold option should the user merely put his telephone instrument 26 off hook, the interface 28 would initiate the subroutine commencing with the portion illustrated in FIG. 4.

Figure 2:
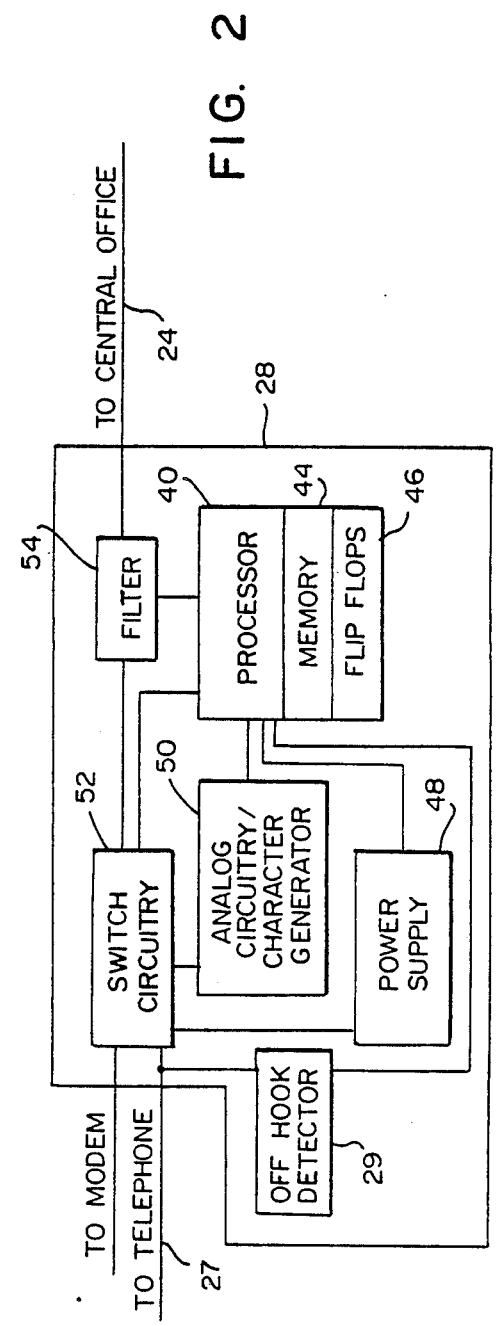
FIG. 2 is a schematized block diagram of the user terminal interface, and showing its various functional components including a processor.

Referring now in detail to FIG. 2 wherein the various functional components of the terminal interface 28 are shown, it should be appreciated that the interface 28 includes a microprocessor 40 such as a Motorola 68XX series which is intergrated with a memory 44 and flip flops 46. The flip flops 46 are employed to hold various logic states as may be necessary to generate signals including the host terminal not ready signal or signals transmitted to the network.

A power supply 48 is also provided not only for the purpose of powering the components of the interface 28 but, in addition, for generating the ring signal for the telephone instrument 26 during a data session. The interface 28 also includes analog circuitry 50 and switch circuitry 52 which are provided for the purpose of keeping carrier up to the modem 20 and generating status signals or toggle signals to the central office. In addition, the interface 28 includes a suitable filter 54 for detecting carrier and optional feature signals generated by the central office 22.

The host interface 34 includes similar components with its microprocessor programmed to effect the necessary subroutines in response to communications from the user interface 28 and also keeping an offhook condition to its central office.

As illustrated in the processor subroutine depicted in FIG. 3, after receipt of an incoming call signal, the processor 40 makes an inquiry as to whether or not a data session is in progress and if the data session is in progress, proceeds to ring the telephone instrument 26. The telephone instrument 26 may be rung by utilizing the power supply 48 as heretofore mentioned.

Additionally, the processor 40 makes an inquiry as to whether or not the telephone 26 is offhook. An offhook detector 29 may comprise any conventional sensor suitable for interrogation by the processor 40. For example, in FIG. 1, the offhook detector 29 is illustrated as comprising a lever switch, an optical sensor, an attitude sensor, e.g. mercury switch, or a proximity sensor placed on or adjacent the telephone instrument. In FIG. 2, the offhook detector is illustrated as a device monitoring loop current through the telephone instrument.

Thus it will be seen that there is provided a data transmission interface system which achieves the various aspects, features and considerations of the present invention and which is well suited to meet the conditions of practical usage.

Among possible variations without departing from the spirit of the invention are included the integration of the modem and interface in a single unit. Such integration could also include the latching of signal functions, especially in integrated equipment with multiple functions. It should be noted that the host computer can be interpreted to include a personal computer and similarly the user terminal should be interpreted to include a personal computer.

In addition, while the host interface 34 has been illustrated as being positioned in front of the host computer 16, the interface may be located within the switched telephone network 12 prior to signal entry to network equipment that converts, stores and/or routes the communications to their final destinations.

As various possible embodiments might be made of the present invention and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. In a circuit switched network data transmission link between terminal means at a terminal location and a host computer at a remote location wherein the host computer is accessed through the circuit switched network at a host end, the terminal means is connected to the circuit switched network by a single line which includes at least one service feature and an application program running in the terminal means, the improvement comprising a switched line modem interface system, the system comprising means for determining when a user desires to utilize the service feature on the single line during a data session and means at the terminal location for preventing loss of the data session when the user utilizes the single line for the service feature, the means for preventing loss of the data session being free of interaction with the application program, the means for preventing loss including means at the terminal location for generating a signal and means for transmitting the signal to the host end, and means at the host end for maintaining the data session in response to said signal, the system further including means responsive to the termination of the service feature on the single line for reestablishing the data session.

2. In a circuit switched network data transmission link between terminal means at a terminal location and a host computer at a remote location wherein the host computer is accessed through the circuit switched network at a host end and, the terminal means is connected to the circuit switched network by a single line which includes at least one service feature, the improvement comprising a transparent switched line modem interface system, the system comprising means for determining when a user desires to utilize the service feature on the single line during a data session and means for preventing loss of the data session when the user utilizes the single line for the service feature, the means for preventing loss of the data session including means at the terminal location for generating a signal indicating that the host computer is not ready in simulation of a signal generated at the host location and transmitted to the terminal location through the circuit switched network, the system further including means responsive to the termination of the service feature on the single line for reestablishing the data session.

3. A transparent switched line modem interface system as constructed in accordance with claim 2 wherein the means for preventing loss of the data session includes means for maintaining a carrier signal at the terminal location in simulation of a carrier signal generated at the remote location and transmitted to the terminal location through the circuit switched network.

4. A transparent switched line modem interface system as constructed in accordance with claim 2, the means for preventing loss of a data session further including means remote from the terminal location for generating a signal indicating that the terminal means is not ready in simulation of a signal generated at the terminal location and transmitted to the host computer through the circuit switched network and means for transmitting such signal to the host computer.

5. A transparent switched line modem interface system as constructed in accordance with claim 4 wherein the means for preventing loss of the data session includes means for maintaining a carrier signal at the host end in simulation of a carrier signal generated at the terminal location and transmitted to the host end through the circuit switched network.

6. A transparent switched line modem interface system as constructed in accordance with claim 2 wherein the optional service feature comprises call waiting, the system additionally comprising filter means for detecting an incoming call waiting signal on the single line, the system further including means for ringing a telephone instrument in response to a detected call waiting signal.

7. An improvement in a circuit switched network data transmission link as constructed in accordance with claim 6 further including a telephone instrument at the terminal location, the means for detecting the incoming call waiting signal including means for energizing the ring signal of the telephone instrument, the user indicating a desire to utilize the optional service feature by placing the telephone instrument offhook, the means for determining when a user desires to utilize the service feature including means for detecting an offhook condition of the telephone instrument.

8. An improvement in a circuit switched network data transmission link as constructed in accordance with claim 2 wherein the service feature comprises call hold, a telephone instrument at the terminal location, means interconnecting the telephone instrument with the means for determining when a user desires to utilize the call hold feature, the user indicating a desire to utilize the call hold feature by placing the telephone instrument offhook, the means for determining when a user desires to utilize the feature comprising means for detecting an offhook condition of the telephone instrument.

9. An improvement in a switched telephone network data transmission link as constructed in accordance with claim 8 wherein the terminal means comprises a computer.

10. A method of suspending a data transmission through a circuit switched network between a terminal means at a terminal location and host computer means connected to the network at a host end of the network which is transparent to both the terminal means and the host computer means and wherein the terminal means is connected to the circuit switched network by a single line having at least one service feature, the method comprising the steps of:

(a) determining whether a user at the terminal location desires to utilize a service feature, (b) generating a signal at the terminal location in simulation of a host end transmitted signal, (c) transmitting the simulated host end signal to the terminal means, (d) generating a signal remote from the terminal location in simulation of a terminal location generated signal, (e) transmitting the simulated terminal location generated signal to the host computer means and, (f) suspending the communications link between the terminal location and the host end through the circuit switched network while maintaining the simulated signals.

11. A method of suspending a data transmission through a circuit switched network in accordance with claim 10 further including a telephone instrument at the terminal location, the step of determining whether the user desires to utilize an optional service feature including the step of detecting when a user places the telephone instrument offhook.

12. A method of suspending a data transmission in accordance with claim 10 further including the steps of:

(g) determining when the service feature is terminated by the user, (h) reestablishing the communications link between the terminal location and the host location through the circuit switched network and, (i) terminating the simulated signals.

13. A method of suspending a data transmission through a circuit switched network in accordance with claim 10 further including a modem interconnecting the circuit switched network and the terminal means, the method further including the steps of:

(j) generating a carrier signal at the terminal location and, (k) transmitting the carrier signal to the modem.

14. A method of suspending a data transmission through a circuit switched network in accordance with claim 10 wherein the service feature comprises call waiting, the method further including the step of detecting an incoming call waiting signal and, in response to such detected signal, providing a user cognizable indication of the call waiting signal during a data session.

15. In a circuit switched network data transmission link between terminal means at a terminal location and a host computer at a remote location wherein the host computer is accessed through the circuit switched network at a host end, the terminal means is connected to the circuit switched network by a single line which includes at least one service feature, the improvement comprising a transparent switched line modem interface system, the system comprising means for determining when a user desires to utilize the service feature on the single line during a data session, means for preventing loss of the data session when the user utilizes the single line for the service feature, the means for preventing loss of a data session including means remote from the terminal location for generating a signal indicating that the terminal means requests suspension of a data session not ready in simulation of a signal generated at the terminal location and transmitted to the host computer end through the circuit switched network and means for transmitting such signal to the host computer end modem, the system further including means responsive to the termination of the service feature on the single line for reestablishing the data session.

16. The improvement in a circuit switched network data transmission link as constructed in accordance with claim 15 wherein the service feature comprises call hold, a telephone instrument at the terminal location, means interconnecting the telephone instrument with the means for determining when a user desires to utilize the call hold feature, the user indicating a desire to utilize the call hold feature by placing the telephone instrument offhook, the means for determining when a user desires to utilize the call hold feature comprises means for detecting an offhook condition.

17. A transparent switched line modem interface as constructed in accordance with claim 15 wherein the means for preventing loss of the data session includes means for maintaining a carrier signal at the host end in simulation of a carrier signal generated at the terminal location and transmitted to the host end through the circuit switched network.

18. The improvement in a circuit switched network data transmission link as constructed in accordance with claim 15 wherein the optional service feature comprises call waiting, the improvement additionally comprising filter means for detecting an incoming call waiting signal on the single line and in response thereto generating a user cognizable signal.

19. The improvement in a circuit switched network data transmission link as constructed in accordance with claim 18 further including a telephone instrument at the terminal location, the means for detecting the incoming call waiting signal including means for energizing the ring signal of the telephone instrument, the user indicating a desire to utilize the optional service feature by placing the telephone instrument offhook, the means for determining when a user desires to utilize the service feature including means for detecting an offhook condition.

* * * * *